US010514950B2

(12) United States Patent
Wei

(10) Patent No.: US 10,514,950 B2
(45) Date of Patent: Dec. 24, 2019

(54) INTERFACE SWITCHING METHOD, APPARATUS, AND DEVICE

(71) Applicant: Huawei Technologies Co., Ltd., Shenzhen, Guangdong (CN)

(72) Inventor: Benfeng Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 138 days.

(21) Appl. No.: 15/565,835

(22) PCT Filed: Apr. 14, 2015

(86) PCT No.: PCT/CN2015/076534
§ 371 (c)(1),
(2) Date: Oct. 11, 2017

(87) PCT Pub. No.: WO2016/165065
PCT Pub. Date: Oct. 20, 2016

(65) Prior Publication Data
US 2018/0129530 A1    May 10, 2018

(51) Int. Cl.
*G06F 9/46*    (2006.01)
*G06F 9/48*    (2006.01)

(52) U.S. Cl.
CPC .................. *G06F 9/485* (2013.01)

(58) Field of Classification Search
CPC .................................................. G06F 9/485
See application file for complete search history.

(56) References Cited

U.S. PATENT DOCUMENTS 5,179,702 A * 1/1993 Spix .......................... G06F 8/41
  711/E12.006
6,005,575 A * 12/1999 Colleran ................. G06F 9/451
  715/807

(Continued)

FOREIGN PATENT DOCUMENTS

CN    102567113 A    7/2012
CN    103500121 A    1/2014

(Continued)

OTHER PUBLICATIONS

B. Popa; "Auto Kill Any Process Download—A very basic and simple "Hitlist" based process batch-terminator"; Mar. 23, 2015; 2 pages.

(Continued)

*Primary Examiner* — Adam Lee
(74) *Attorney, Agent, or Firm* — Kilpatrick Townsend & Stockton LLP

(57) ABSTRACT

The present invention discloses a process management method and apparatus, and pertains to the field of computer technologies. The method includes: obtaining benchmark duration for interface switching; determining, after interface switching, switching duration of the interface switching; and stopping, according to a preset process priority, a process having a lower priority, if the switching duration is longer than the benchmark duration, and a difference between the switching duration and the benchmark duration is greater than a preset threshold. By means of the present invention, process management efficiency can be improved.

15 Claims, 2 Drawing Sheets

(56) References Cited

U.S. PATENT DOCUMENTS

| | | | |
|---|---|---|---|
| 6,065,114 A * | 5/2000 | Zahir | G06F 9/3009 712/228 |
| 6,105,052 A * | 8/2000 | Okamura | G06F 9/449 718/104 |
| 6,105,102 A * | 8/2000 | Williams | G06F 13/24 327/142 |
| 6,367,005 B1 * | 4/2002 | Zahir | G06F 9/3004 712/228 |
| 6,477,558 B1 * | 11/2002 | Irving | G06F 9/4887 718/100 |
| 7,275,248 B2 * | 9/2007 | Nishida | G06F 1/206 718/100 |
| 7,603,448 B2 * | 10/2009 | McCombe | G06F 9/4881 709/201 |
| 8,010,963 B2 * | 8/2011 | Heffley | G06F 9/461 712/220 |
| 8,234,648 B1 * | 7/2012 | Joyce | G06F 9/5027 718/102 |
| 8,924,990 B2 * | 12/2014 | Nguyen | G06F 9/4843 718/1 |
| 9,286,131 B2 * | 3/2016 | Tsirkin | G06F 9/5022 |
| 9,430,280 B1 * | 8/2016 | Shih | G06F 9/485 |
| 2005/0034129 A1 * | 2/2005 | Chew | G06F 9/44594 718/100 |
| 2006/0085787 A1 * | 4/2006 | Breslaw | G06F 9/485 718/100 |
| 2007/0011661 A1 | 1/2007 | Itoh | |
| 2007/0150900 A1 * | 6/2007 | Hankins | G06F 9/462 718/108 |
| 2007/0233924 A1 * | 10/2007 | Chauvet | G06F 9/485 710/240 |
| 2008/0165800 A1 * | 7/2008 | Chen | G06F 9/526 370/465 |
| 2008/0168130 A1 * | 7/2008 | Chen | G06F 9/5027 709/203 |
| 2008/0209423 A1 * | 8/2008 | Hirai | G06F 9/5027 718/102 |
| 2008/0222434 A1 * | 9/2008 | Shimizu | G06F 1/3203 713/300 |
| 2008/0240406 A1 | 10/2008 | Akula et al. | |
| 2008/0271042 A1 * | 10/2008 | Musuvathi | G06F 11/3688 718/108 |
| 2008/0282247 A1 * | 11/2008 | Kreuder | G06F 9/485 718/102 |
| 2008/0295107 A1 * | 11/2008 | Muscarella | G06F 9/5027 718/104 |
| 2009/0031312 A1 * | 1/2009 | Mausolf | G06F 9/4881 718/102 |
| 2009/0077564 A1 * | 3/2009 | Loeser | G06F 9/462 718/108 |
| 2009/0083747 A1 * | 3/2009 | Huang | G06F 9/485 718/104 |
| 2009/0113444 A1 * | 4/2009 | Hackbom | G06F 9/461 719/312 |
| 2009/0198389 A1 * | 8/2009 | Kirchhof-Falter | G06F 9/485 701/1 |
| 2009/0287466 A1 * | 11/2009 | Klahold | G06F 9/4887 703/21 |
| 2009/0300633 A1 * | 12/2009 | Altrichter | G06F 9/4856 718/103 |
| 2009/0320034 A1 * | 12/2009 | Tsunoda | G11C 7/1006 718/103 |
| 2010/0050184 A1 | 2/2010 | Lin et al. | |
| 2010/0064298 A1 * | 3/2010 | Schneider | G06F 9/485 719/317 |
| 2010/0122257 A1 * | 5/2010 | Wada | G06F 9/485 718/102 |
| 2010/0153963 A1 * | 6/2010 | Kakarlamudi | G06F 9/5083 718/105 |
| 2010/0162041 A1 * | 6/2010 | El-Shishiny | G06F 9/4881 714/10 |
| 2010/0306413 A1 * | 12/2010 | Kamay | H04N 19/503 709/247 |
| 2011/0055841 A1 * | 3/2011 | Senno | G06F 9/52 718/103 |
| 2011/0154328 A1 * | 6/2011 | Mo | G06F 9/45541 718/1 |
| 2011/0209158 A1 * | 8/2011 | Paul | G06F 9/30076 718/108 |
| 2012/0174106 A1 * | 7/2012 | Seo | G06F 9/485 718/100 |
| 2012/0216208 A1 * | 8/2012 | Takemura | G08G 1/09623 718/103 |
| 2012/0311608 A1 * | 12/2012 | Park | G06F 3/0486 718/107 |
| 2013/0074082 A1 | 3/2013 | Yu | |
| 2013/0104144 A1 * | 4/2013 | Arcese | G06F 3/0484 718/107 |
| 2013/0174179 A1 * | 7/2013 | Park | G06F 9/4843 718/107 |
| 2014/0007106 A1 * | 1/2014 | Weksler | G06F 9/485 718/100 |
| 2014/0143791 A1 * | 5/2014 | Mark | G06F 9/485 719/318 |
| 2014/0208328 A1 * | 7/2014 | Chen | G06F 9/485 718/103 |
| 2014/0325518 A1 * | 10/2014 | Kim | G06F 9/5022 718/102 |
| 2015/0020075 A1 * | 1/2015 | Glew | G06F 9/4881 718/101 |
| 2015/0347181 A1 * | 12/2015 | Myrick | G06F 9/44594 718/102 |
| 2015/0347209 A1 * | 12/2015 | Lyubinin | G06F 21/31 719/313 |

FOREIGN PATENT DOCUMENTS

| | | |
|---|---|---|
| CN | 103631661 A | 3/2014 |
| CN | 104199669 A | 12/2014 |
| CN | 104317373 A | 1/2015 |
| CN | 104375624 A | 2/2015 |
| CN | 104375880 A | 2/2015 |
| EP | 2538327 A1 | 12/2012 |
| JP | 2000-284976 A | 10/2000 |
| JP | 2007018282 A | 1/2007 |
| JP | 2007026309 A | 2/2007 |
| KR | 10-2007-0010788 A | 1/2007 |
| WO | 2012152049 A2 | 11/2012 |

OTHER PUBLICATIONS

Yan Jiang et al., "Low memory killer algorithm based on statistical analysis and predicting", Computer engineering and design vol. 35 No. 1, Jan. 2014, total 6 pages.

* cited by examiner

INTERFACE SWITCHING METHOD, APPARATUS, AND DEVICE

CROSS-REFERENCE TO RELATED APPLICATIONS

This application is a National Stage of International Application No. PCT/CN2015/076534, filed on Apr. 14, 2015, which is hereby incorporated by reference in its entirety.

TECHNICAL FIELD

The present invention relates to the field of computer technologies, and in particular, to a process management method, apparatus, and device.

BACKGROUND

With development of mobile terminal technologies, capabilities of a mobile terminal are increasingly stronger, and increasingly more application programs can be installed on a mobile terminal. When using a mobile terminal, a user often switches a currently started application program to the background for running, and then starts a new application program. For example, after browsing Weibo, the user may switch Weibo to the background for running, and start WeChat. An application program generally runs in the mobile terminal in the form of a process. If the user starts multiple application programs in the mobile terminal, multiple processes run in the background of the mobile terminal and occupy plenty of processing resources, slowing down a processing speed of the mobile terminal.

To resolve this problem, a function of stopping a process is set in the mobile terminal, and the user may select, on a process management page, a process that needs to be stopped, and click on a stop option to stop the process in the mobile terminal.

In a process of implementing the present invention, the prior art has at least the following problems:

A user needs to manually select processes that need to be stopped, and then stop these processes. This results in relatively low process stopping efficiency.

SUMMARY

To resolve the problem in the prior art, embodiments of the present invention provide a process management method, apparatus, and device. The technical solutions are as follows:

According to a first aspect, a process management method is provided, where the method includes:

obtaining benchmark duration for interface switching;

determining, after interface switching, switching duration of the interface switching; and stopping, according to a preset process priority, a process having a lower priority, if the switching duration is longer than the benchmark duration, and a difference between the switching duration and the benchmark duration is greater than a preset threshold.

With reference to the first aspect, in a first possible implementation manner of the first aspect, the obtaining benchmark duration for interface switching includes:

detecting at least one time of interface switching that is within preset duration after startup;

detecting switching duration of the at least one time of interface switching; and calculating an average value of the switching duration of the at least one time of interface switching, and using the average value as the benchmark duration for interface switching.

With reference to the first possible implementation manner of the first aspect, in a second possible implementation manner of the first aspect, the interface switching includes interface switching of a first switching type, and the detecting at least one time of interface switching that is within preset duration after startup, and detecting switching duration of the at least one time of interface switching specifically includes:

detecting, during the preset duration from interface switching of the first switching type performed for the first time after startup, at least one time of interface switching of the first switching type; and detecting switching duration of the at least one time of interface switching; and the calculating an average value of the switching duration of the at least one time of interface switching, and using the average value as the benchmark duration for interface switching includes:

calculating an average value of the switching duration of the at least one time of interface switching of the first switching type within the preset duration, and using the average value as benchmark duration for interface switching of the first switching type.

With reference to the first aspect, in a third possible implementation manner of the first aspect, the obtaining benchmark duration for interface switching includes:

obtaining benchmark duration for interface switching of at least one switching type; and the stopping, according to a preset process priority, a process having a lower priority, if the switching duration is longer than the benchmark duration, and a difference between the switching duration and the benchmark duration is greater than a preset threshold includes:

determining first benchmark duration corresponding to the interface switching of the at least one switching type; and stopping, according to a preset process priority, a process having a lower priority, if the switching duration is longer than the first benchmark duration, and a difference between the switching duration and the first benchmark duration is greater than a preset threshold.

With reference to the first aspect, in a fourth possible implementation manner of the first aspect, the determining, after interface switching, switching duration of the interface switching includes:

detecting first interface switching during a preset period, and determining switching duration of the first interface switching; or after interface switching of a preset switching type, determining switching duration of the interface switching.

With reference to the first aspect, in a fifth possible implementation manner of the first aspect, the method further includes adjusting the preset threshold, and the adjusting the preset threshold includes:

receiving a process stopping input, and obtaining switching duration of last interface switching prior to the stopping input; and if the switching duration of the last interface switching prior to the stopping input is longer than the benchmark duration, and a difference between the switching duration of the last interface switching prior to the stopping input and the benchmark duration is less than the preset threshold, reducing the preset threshold according to the switching duration and the benchmark duration.

According to a second aspect, a process management device is provided, where the device includes a processor and an input apparatus, where the processor is configured to obtain benchmark duration for interface switching;

the input apparatus is configured to trigger, according to an input of a user, the processor to perform interface switching;

the processor is further configured to determine, after the interface switching, switching duration of the interface switching; and the processor is further configured to stop, according to a preset process priority, a process having a lower priority, if the switching duration is longer than the benchmark duration, and a difference between the switching duration and the benchmark duration is greater than a preset threshold.

With reference to the second aspect, in a first possible implementation manner of the second aspect, the processor is configured to:

detect at least one time of interface switching that is within preset duration after startup;

detect switching duration of the at least one time of interface switching; and calculate an average value of the switching duration of the at least one time of interface switching, and use the average value as the benchmark duration for interface switching.

With reference to the first possible implementation manner of the second aspect, in a second possible implementation manner of the second aspect, the interface switching includes interface switching of a first switching type, and the processor is configured to:

detect, during the preset duration from interface switching of the first switching type performed for the first time after startup, at least one time of interface switching of the first switching type; and detect switching duration of the at least one time of interface switching; and the processor is configured to:

calculate an average value of the switching duration of the at least one time of interface switching of the first switching type within the preset duration, and use the average value as benchmark duration for interface switching of the first switching type.

With reference to the second aspect, in a third possible implementation manner of the second aspect, the processor is configured to:

obtain benchmark duration for interface switching of at least one switching type; and the processor is configured to:

determine first benchmark duration corresponding to the interface switching of the at least one switching type; and stop, according to a preset process priority preset in a memory, a process having a lower priority, if the switching duration is longer than the first benchmark duration, and a difference between the switching duration and the first benchmark duration is greater than a preset threshold stored in the memory.

With reference to the second aspect, in a fourth possible implementation manner of the second aspect, the processor is configured to:

detect first interface switching during a preset period, and determine switching duration of the first interface switching; or after interface switching of a preset switching type, determine switching duration of the interface switching.

With reference to the second aspect, in a fifth possible implementation manner of the second aspect, the input apparatus is configured to receive a process stopping input; and the processor is configured to:

obtain switching duration of last interface switching prior to the stopping input; and the processor is configured to:

if the switching duration of the last interface switching prior to the stopping input is longer than the benchmark duration, and a difference between the switching duration of the last interface switching prior to the stopping input and the benchmark duration is less than the preset threshold stored in a memory, reduce the preset threshold according to the switching duration and the benchmark duration.

According to a third aspect, a process management apparatus is provided, where the apparatus includes:

an obtaining module, configured to obtain benchmark duration for interface switching;

a determining module, configured to determine, after interface switching, switching duration of the interface switching; and a management module, configured to stop, according to a preset process priority, a process having a lower priority, if the switching duration is longer than the benchmark duration, and a difference between the switching duration and the benchmark duration is greater than a preset threshold.

With reference to the third aspect, in a first possible implementation manner of the third aspect, the obtaining module is configured to:

detect at least one time of interface switching that is within preset duration after startup;

detect switching duration of the at least one time of interface switching; and calculate an average value of the switching duration of the at least one time of interface switching, and use the average value as the benchmark duration for interface switching.

With reference to the first possible implementation manner of the third aspect, in a second possible implementation manner of the third aspect, the interface switching includes interface switching of a first switching type, and the obtaining module is configured to:

detect, during the preset duration from interface switching of the first switching type performed for the first time after startup, at least one time of interface switching of the first switching type; and detect switching duration of the at least one time of interface switching; and the obtaining module is configured to:

calculate an average value of the switching duration of the at least one time of interface switching of the first switching type within the preset duration, and use the average value as benchmark duration for interface switching of the first switching type.

With reference to the third aspect, in a third possible implementation manner of the third aspect, the obtaining module is configured to:

obtain benchmark duration for interface switching of at least one switching type; and the management module is configured to:

determine first benchmark duration corresponding to the interface switching of the at least one switching type; and stop, according to a preset process priority, a process having a lower priority, if the switching duration is longer than the first benchmark duration, and a difference between the switching duration and the first benchmark duration is greater than a preset threshold.

With reference to the third aspect, in a fourth possible implementation manner of the third aspect, the obtaining module is configured to:

detect first interface switching during a preset period, and determine switching duration of the first interface switching; or after interface switching of a preset switching type, determine switching duration of the interface switching.

With reference to the third aspect, in a fifth possible implementation manner of the third aspect, the apparatus further includes an adjusting module, configured to:

receive a process stopping input, and obtain switching duration of last interface switching prior to the stopping input; and if the switching duration of the last interface switching prior to the stopping input is longer than the benchmark duration, and a difference between the switching duration of the last interface switching prior to the stopping input and the benchmark duration is less than the preset threshold, reduce the preset threshold according to the switching duration and the benchmark duration.

The technical solutions provided in the embodiments of the present invention bring the following advantageous effects:

In the embodiments of the present invention, benchmark duration for interface switching is obtained; after interface switching processing, switching duration of the interface switching processing is determined; and if the switching duration is longer than the benchmark duration, and a difference between the switching duration and the benchmark duration is greater than a preset threshold, a process having a lower priority is stopped according to a preset process priority. In this manner, when switching duration is longer than benchmark duration, and a difference between the switching duration and the benchmark duration is greater than a preset threshold, a terminal can automatically perform process stopping processing, without the need of manually selecting, by a user, a process that needs to be stopped. Therefore, process management efficiency can be improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Embodiment 1

Figure 1:
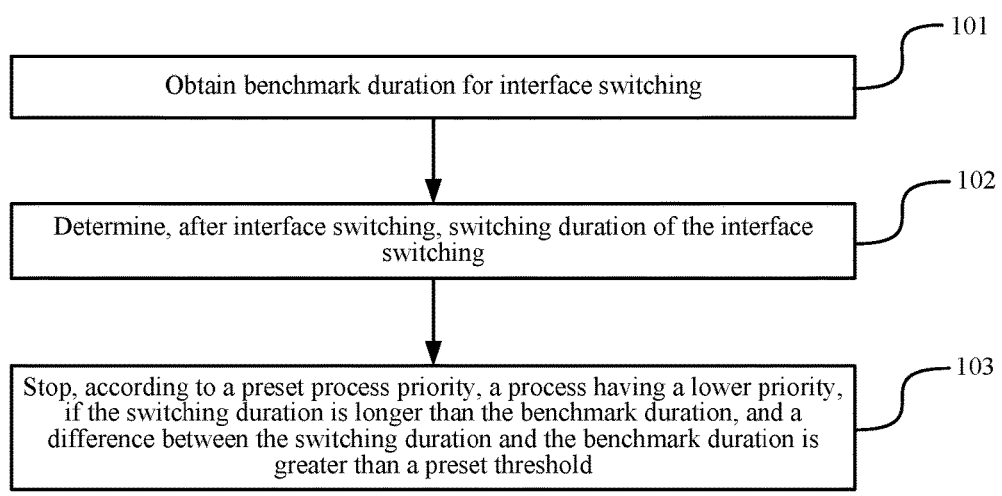
FIG. 1 is a flowchart of a process management method according to an embodiment of the present invention.

This embodiment of the present invention provides a process management method. As shown in FIG. 1, a processing process of the method may include the following steps.

Step 101: Obtain benchmark duration for interface switching.

Step 102: Determine, after interface switching, switching duration of the interface switching.

Step 103: Stop, according to a preset process priority, a process having a lower priority, if the switching duration is longer than the benchmark duration, and a difference between the switching duration and the benchmark duration is greater than a preset threshold.

In this embodiment of the present invention, benchmark duration for interface switching is obtained; after interface switching processing, switching duration of the interface switching processing is determined; and if the switching duration is longer than the benchmark duration, and a difference between the switching duration and the benchmark duration is greater than a preset threshold, a process having a lower priority is stopped according to a preset process priority. In this manner, when switching duration is longer than benchmark duration, and a difference between the switching duration and the benchmark duration is greater than a preset threshold, a terminal can automatically perform process stopping processing, without the need of manually selecting, by a user, a process that needs to be stopped. Therefore, process management efficiency can be improved.

Embodiment 2

This embodiment of the present invention provides a process management method. The method may be executed by a terminal having a multi-process processing capability. The terminal may be a mobile terminal such as a mobile phone or a tablet computer.

A processing process shown in FIG. 1 is described in detail below with reference to a specific implementation manner, where content may be as follows.

Step 101: Obtain benchmark duration for interface switching.

The interface switching may be processing of switching an interface currently displayed on a terminal to another interface. The interface switching may be interface switching in a system (for example, switching from a desktop of the system to a setting interface of the system), may be interface switching in an application program (for example, switching from a chatting interface of WeChat to a contact interface of WeChat), or may be interface switching between a system and an application program (for example, switching to an interface of an application program after the application program is started on a desktop of the system). The benchmark duration for interface switching may be duration, obtained by means of actual detection, manual setting or the like, for completing one time of interface switching in a state in which a terminal has just been started up and no unnecessary process is started.

During implementation, when a user needs to use a terminal, the user may start up the terminal, for example, pressing an on/off control button of the terminal. After startup, the terminal may obtain the benchmark duration for interface switching. The benchmark duration for interface switching may be benchmark duration that is obtained by the terminal last time the user uses the terminal, or may be benchmark duration that is pre-stored in the terminal by a technician.

Optionally, the benchmark duration for interface switching may be determined according to detected switching duration. Correspondingly, a processing process of step 101 may be as follows: detecting at least one time of interface switching that is within preset duration after startup; detecting switching duration of the at least one time of interface switching; and calculating an average value of the switching duration of the at least one time of interface switching, and using the average value as the benchmark duration for interface switching.

During implementation, after startup, the terminal may start timing, and detect switching duration of at least one time of interface switching that is within preset duration after startup. Specifically, during the preset duration, when receiving an interface switching instruction, the terminal may obtain a time point (which may be referred to as a first time point) at which the interface switching instruction is received, and perform interface switching corresponding to the interface switching instruction. After completing the interface switching, the terminal may obtain a time point (which may be referred to as a second time point) at which the interface switching is completed. The terminal may calculate a time difference (that is, switching duration) between the first time point and the second time point, and then store the switching duration. During the preset duration after startup, for each time of interface switching, the terminal may detect switching duration, and after the preset duration elapses, the terminal may stop detecting switching duration. The terminal may calculate an average value of multiple pieces of switching duration obtained during the preset duration, and use the average value as the benchmark duration for interface switching.

For example, the preset duration is one hour, during one hour after startup of the terminal, there are three times of interface switching in total, and switching duration is 300 ms, 280 ms, and 260 ms respectively, and the terminal may determine that the benchmark duration is (300+280+260) ms/3=280 ms.

Optionally, switching duration of interface switching of different switching types may be detected. The interface switching may include interface switching of a first switching type. Correspondingly, the processing process of the foregoing step may be as follows: detecting, during the preset duration from interface switching of the first switching type performed for the first time after startup, at least one time of interface switching of the first switching type; detecting switching duration of the at least one time of interface switching; and calculating an average value of the switching duration of the at least one time of interface switching of the first switching type within the preset duration, and using the average value as benchmark duration for interface switching of the first switching type.

Figure 2:
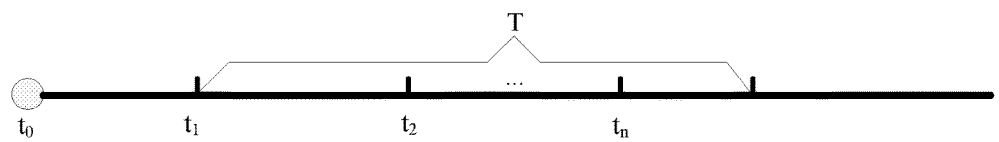
FIG. 2 is a schematic diagram of a timeline of a process of determining benchmark duration according to an embodiment of the present invention.

During implementation, a switching type of interface switching may be preset in the terminal. The switching type may be: interface switching in a system (for example, switching from a desktop of the system to a setting interface of the system), may be interface switching in an application program (for example, switching from a chatting interface of WeChat to a contact interface of WeChat), or may be interface switching between a system and an application program (for example, switching to an interface of an application program after the application program is started on a desktop of the system). After startup of the terminal, the user may switch an interface on the terminal, and the terminal receives an interface switching instruction, and determines a switching type of interface switching corresponding to the detected interface switching instruction. The terminal may detect, from the first time of interface switching of a switching type (that is, a first switching type), switching duration of each time of interface switching of the first switching type. The terminal may detect switching duration of multiple times of interface switching of the first switching type. As shown in FIG. 2, $t_0$ is a start-up time, $t_1$ is a starting time point at which interface switching of the first switching type is performed for the first time, $t_2$ is a starting time point at which interface switching of the first switching type is performed for the second time, and $t_n$ is a starting time point at which interface switching of the first switching type is performed for the $n^{th}$ time, and T is the preset duration. After the preset duration elapses, the terminal may stop detecting switching duration of interface switching of the first switching type, and calculate an average value (which may be referred to as a first average value) of switching duration that is detected during the preset duration, and use the first average value as benchmark duration for interface switching of the first switching type. For each preset switching type, the terminal may calculate benchmark duration, to determine benchmark duration for interface switching of each switching type.

In addition, benchmark duration for the first switching type that is obtained last time the terminal runs may be stored in the terminal. After calculating the first average value, the terminal may determine a difference between the first average value and the stored benchmark duration for the first switching type. If a ratio of the difference to the stored benchmark duration for the first switching type is greater than a preset threshold, the first average value is used as the benchmark duration for the first switching type, and if the ratio of the difference to the stored benchmark duration for the first switching type is not greater than the preset threshold, the benchmark duration for the first switching type may be maintained to be unchanged.

Optionally, interface switching on the terminal may be classified into multiple switching types. Correspondingly, the processing process of step 101 may be as follows: obtaining benchmark duration for interface switching of at least one switching type.

During implementation, benchmark duration of interface switching corresponding to the switching types may be pre-stored in the terminal. After startup, the terminal may obtain the benchmark duration for interface switching of the at least one switching type. The benchmark duration may be benchmark duration obtained by the terminal last time the terminal is used, or may be benchmark durations pre-stored in the terminal by a technician.

Step 102: Determine, after interface switching, switching duration of the interface switching.

During implementation, after obtaining the benchmark duration for interface switching, if receiving an interface switching instruction, the terminal may switch a current interface according to the interface switching instruction, and determine switching duration of the current interface switching. The switching duration may be a time difference between a time point at which the interface switching instruction is received and a time point at which the interface switching is completed.

Optionally, a triggering condition for determining switching duration of interface switching may be set. Correspondingly, a processing process of step 102 may be as follows: detecting first interface switching during a preset period, and determining switching duration of the first interface switching; or after interface switching of a preset switching type, determining switching duration of the interface switching.

During implementation, a detection period may be preset in the terminal, and during the preset period, the terminal may detect switching duration of interface switching. Specifically, during the preset period, when receiving an interface switching instruction for the first time, the terminal may start timing, until the terminal completes interface switching corresponding to the interface switching instruction, so as to obtain switching duration of the current interface switching. The terminal may determine only the switching duration of the first interface switching within the preset detection period.

Alternatively, several switching types may be preset in the terminal, and after receiving an interface switching instruction, the terminal may determine whether interface switching corresponding to the interface switching instruction is of a preset switching type. If the interface switching is of a preset switching type, the terminal may calculate switching duration of the current interface switching, and if the interface switching is not of a preset switching type, the terminal may only complete the interface switching, and skip calculating the switching duration of the current interface switching.

Step 103: Stop, according to a preset process priority, a process having a lower priority, if the switching duration is longer than the benchmark duration, and a difference between the switching duration and the benchmark duration is greater than a preset threshold.

During implementation, a process priority may be preset in the terminal. For example, in an Android system, process running states may be classified into five types, which, in descending order of priorities, are a foreground process, a visible process, a service process, a background process, and an empty process respectively. A correspondence between process priorities and the processes is shown in table 1 below.

TABLE 1

| Foreground process | Process 3 |
| --- | --- |
| Visible process | Process 2, process 4 |
| Service process | Process 5, process 8 |
| Background process | Process 9 |
| Empty process | Process 1, process 6, process 7 |

After interface switching, the terminal may determine switching duration of the interface switching, and then the terminal may compare the switching duration and benchmark duration. If the switching duration is longer than the benchmark duration, the terminal may determine a difference between the switching duration and the benchmark duration, and then determine whether the difference is greater than a preset threshold. The threshold may be specific duration, or may be a percentage. If determining that the difference between the switching duration and the benchmark duration is greater than the preset threshold, the terminal may select, according to the preset process priority, a process to be stopped from processes running locally, and stop the selected process. The terminal may preferentially stop, among the processes running locally, empty processes having a lowest priority (that is, the process 1, the process 6, and the process 7), and after stopping all the empty processes, may stop a background process (that is, the process 9), and so on. In addition, if the switching duration is shorter than the benchmark duration, or the difference between the switching duration and the benchmark duration is not greater than the preset threshold, the terminal may not stop a process.

In a process of stopping the process, the terminal may continue detecting switching duration of interface switching, and if detected switching duration is longer than the benchmark duration, and a difference between the switching duration and the benchmark duration is greater than the preset threshold, the terminal continues to stop processes, and until detected switching duration is shorter than the benchmark duration, or a difference between the switching duration and the benchmark duration is less than the preset threshold, the terminal stops stopping processes.

Optionally, for the foregoing case in which interface switching on the terminal is classified into multiple switching types, correspondingly, a processing process of step 103 may be as follows: determining first benchmark duration corresponding to interface switching of at least one switching type; and stopping, according to a preset process priority, a process having a lower priority, if the switching duration is longer than the first benchmark duration, and a difference between the switching duration and the first benchmark duration is greater than a preset threshold.

During implementation, after interface switching, the terminal may determine switching duration of the current interface switching, and may determine a switching type (which may be referred to as a switching type a) of the current interface switching, and then may search, in obtained benchmark duration for interface switching corresponding to each switching type, for benchmark duration (that is, first benchmark duration) corresponding to the switching type a.

The terminal may compare the current switching duration and the first benchmark duration, and if the current switching duration is longer than the first benchmark duration, the terminal may determine a difference between the current switching duration and the first benchmark duration, and then determine whether the difference is greater than the preset threshold. If determining that the difference between the current switching duration and the first benchmark duration is greater than the preset threshold, the terminal may stop, among processes running locally and according to the preset process priority, a process having a lower priority (for example, an empty process), and after stopping all empty processes, may stop a background process, and so on.

Optionally, the preset threshold may be adjusted, and a corresponding processing process may be as follows: receiving a process stopping input, and obtaining switching duration of last interface switching prior to the stopping input; and if the switching duration of the last interface switching prior to the stopping input is longer than the benchmark duration, and a difference between the switching duration of the last interface switching prior to the stopping input and the benchmark duration is less than the preset threshold, reducing the preset threshold according to the switching duration and the benchmark duration.

During implementation, after interface switching, the terminal may determine switching duration of the current interface switching, and if the switching duration is shorter than the benchmark duration, or a difference between the switching duration and the benchmark duration is less than a preset threshold, the terminal may store the switching duration, otherwise, skip storing the switching duration.

In a process of using the terminal by the user, the user may desire a processing speed of the terminal to be faster. In this case, the user may select, in a setting interface of the terminal, a process intended to be stopped, and click on a process stopping button, and the terminal receives the process stopping input, and then may stop the process selected by the user. After receiving the process stopping input, the terminal may further obtain switching duration of last interface switching prior to the stopping input, and if the switching duration is longer than the benchmark duration, and a difference between the switching duration and the benchmark duration is less than a preset threshold, the terminal may determine the difference between the switching duration and the benchmark duration, and reduce the preset threshold according to the difference. The terminal may use the difference as the preset threshold, or may use a value between the difference and the preset threshold as the preset threshold.

For example, the terminal obtains switching duration of 110 ms, where the benchmark duration is 100 ms, and the preset threshold is 20 ms, and the terminal may determine that a difference between the switching duration and the benchmark duration is 10 ms, and then may use 15 ms as the preset threshold.

In this embodiment of the present invention, benchmark duration for interface switching is obtained; after interface switching processing, switching duration of the interface switching processing is determined; and if the switching duration is longer than the benchmark duration, and a difference between the switching duration and the benchmark duration is greater than a preset threshold, a process having a lower priority is stopped according to a preset process priority. In this manner, when switching duration is longer than benchmark duration, and a difference between the switching duration and the benchmark duration is greater than a preset threshold, a terminal can automatically perform process stopping processing, without the need of manually selecting, by a user, a process that needs to be stopped. Therefore, process management efficiency can be improved.

Embodiment 3

Figure 3:
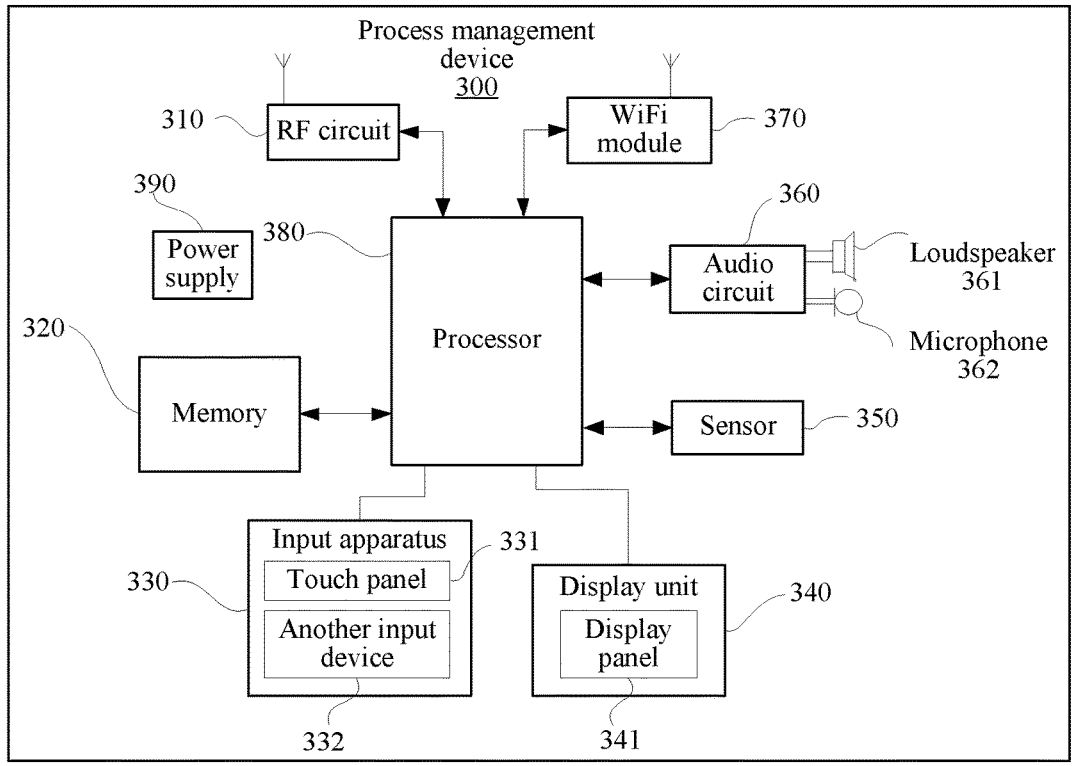
FIG. 3 is a schematic structural diagram of a process management device 300 according to an embodiment of the present invention.

Based on the same technical conception, this embodiment of the present invention further provides a process management device 300, which can be used to execute the methods in Embodiment 1 and Embodiment 2 of the present invention. FIG. 3 shows a structure of the process management device 300 provided in this embodiment of the present invention.

The device may be a terminal device, including a mobile phone, a tablet computer, a PDA (Personal Digital Assistant, personal digital assistant), a POS (Point of Sales, point of sale), a vehicle-mounted computer, or the like. Using a case in which the device is a mobile phone as an example, FIG. 3 shows a block diagram of a partial structure of a mobile phone 300 related to the device provided in this embodiment of the present invention. Referring to FIG. 3, the mobile phone 300 includes components such as an RF (Radio Frequency, radio frequency) circuit 310, a memory 320, an input apparatus 330, a display unit 340, a sensor 350, an audio circuit 360, a WiFi (wireless fidelity, wireless fidelity) module 370, a processor 380, and a power supply 390. A person skilled in the art can understand that, the structure of the mobile phone shown in FIG. 3 is merely used as an example of an implementation manner, and does not limit the mobile phone. The mobile phone may include more or fewer components than those shown in the figure, or combine some components, or have a different component arrangement.

The following specifically describes the components of the mobile phone 300 with reference to FIG. 3.

The RF circuit 310 may be configured to receive and send signals during an information receiving and sending process or a call process. Particularly, the RF circuit 710 receives downlink information from a base station, then delivers the downlink information to the processor 380 for processing, and sends uplink data to the base station. Generally, the RF circuit includes, but is not limited to an antenna, at least one amplifier, a transceiver, a coupler, an LNA (low noise amplifier, low noise amplifier), a duplexer, and the like. In addition, the RF circuit 310 may also communicate with a network and another device by means of wireless communication. The wireless communication may use any communications standard or protocol, including but not limited to: GSM (Global System of Mobile communication, Global System for Mobile Communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), LTE (Long Term Evolution, Long Term Evolution), e-mail, and SMS (Short Messaging Service, short message service).

The memory 320 may be configured to store a software program and module. The processor 380 runs the software program and module stored in the memory 320, to implement various functional applications and data processing of the mobile phone 300. The memory 320 may mainly include a program storage area and a data storage area. The program storage area may store an operating system, an application program required by at least one function (such as a sound playback function and an image display function), and the like; and the data storage area may store data (such as audio data and a telephone directory) created according to use of the mobile phone 300, and the like. In addition, the memory 320 may include a high-speed random access memory, and may also include a non-volatile memory such as at least one disk storage component, a flash memory component, or another volatile solid-state storage component.

The input unit 330 may be configured to receive input digit or character information, and generate keyboard signal input related to a user setting and function control of the mobile phone 300. Specifically, the input apparatus 330 may include a touch panel 331 and another input device 332. The touch panel 331, also referred to as a touchscreen, may collect a touch operation of a user on or near the touch panel 331 (such as an operation of a user on the touch panel 331 or near the touch panel 331 by using any suitable object or accessory such as a finger or a stylus), and drive a corresponding connection apparatus according to a preset program. Optionally, the touch panel 331 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 380. Moreover, the touch controller can receive and execute a command sent from the processor 380. In addition, the touch panel 331 may be a resistive, capacitive, infrared, or surface sound wave type touch panel. In addition to the touch panel 331, the input apparatus 330 may further include the another input device 332. Specifically, the another input device 332 may include, but is not limited to, one or more of a physical keyboard, a functional key (such as a volume control key or a switch key), a trackball, a mouse, and a joystick.

The display unit 340 may be configured to display information input by the user or information provided for the user, and various menus of the mobile phone 300. The display unit 340 may include a display panel 341. Optionally, the display panel 341 may be configured by using an LCD (Liquid Crystal Display, liquid crystal display), an OLED (Organic Light-Emitting Diode, organic light-emitting diode), or the like. Further, the touch panel 331 may cover the display panel 341. After detecting a touch operation on or near the touch panel 331, the touch panel 331 transfers the touch operation to the processor 380, so as to determine the type of the touch event. Then, the processor 380 provides a corresponding visual output on the display panel 341 according to the type of the touch event. Although in FIG. 3, the touch panel 331 and the display panel 341 are used as two separate components to implement input and output functions of the mobile phone 300, in some embodiments, the touch panel 331 and the display panel 341 may be integrated to implement the input and output functions of the mobile phone 300.

The mobile phone 300 may further include at least one sensor 350, such as an optical sensor, a motion sensor, and other sensors. Specifically, the optical sensor may include an ambient light sensor and a proximity sensor. The ambient light sensor may adjust luminance of the display panel 341 according to brightness of the ambient light. The proximity sensor may switch off the display panel 341 and/or backlight when the mobile phone 300 is moved to the ear. As one type of motion sensor, an acceleration sensor can detect magnitude of accelerations in various directions (generally on three axes), can detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. As for other sensors such as a gyroscope, a barometer, a hygrometer, a thermometer, and an infrared sensor that may be further configured in the mobile phone 300, details are not described herein again.

The audio circuit 360, a speaker 361, and a microphone 362 may provide audio interfaces between the user and the mobile phone 300. The audio circuit 360 may convert received audio data into an electric signal and transmit the electric signal to the speaker 361. The speaker 361 converts the electric signal into a sound signal for output. On the other hand, the microphone 362 converts a collected sound signal into an electric signal. The audio circuit 360 receives the electric signal and converts the electric signal into audio data, and outputs the audio data to the processor 380 for processing. Then, the processor 380 sends the audio data to, for example, another mobile phone by using the RF circuit 310, or outputs the audio data to the memory 320 for further processing.

WiFi belongs to a short distance wireless transmission technology. The mobile phone 300 may help, by using the WiFi module 370, the user to receive and send e-mails, browse a webpage, access streaming media, and so on, which provides wireless broadband Internet access for the user. Although FIG. 3 shows the WiFi module 370, it may be understood that the WiFi module 370 is not a necessary component of the mobile phone 300, and when required, the WiFi module 370 may be omitted as long as the scope of the essence of the present invention is not changed.

The processor 380 is a control center of the mobile phone 300, and is connected to various parts of the whole mobile phone by using various interfaces and lines. By running or executing the software program and/or the module stored in the memory 320, and invoking the data stored in the memory 320, the processor 880 performs various functions and data processing of the mobile phone 300, thereby performing overall monitoring on the mobile phone. Optionally, the processor 380 may include one or more processing units. Preferably, the processor 380 may be integrated with an application processor and a modem processor. The application processor mainly processes an operating system, a user interface, an application program, and the like. The modem processor mainly processes wireless communication. It may be understood that the foregoing modem processor may be not integrated into the processor 380.

The mobile phone 300 further includes the power supply 390 (such as a battery) for supplying power to the components. Preferably, the power supply may be logically connected to the processor 380 by using a power management system, thereby implementing functions such as charging, discharging and power consumption management by using the power management system.

Although not shown in the figure, the mobile phone 300 may further include a camera, a Bluetooth module, and the like, which are not further described herein.

In this embodiment of the present invention, the processor 380 and the input apparatus 330 included in the device have the following functions:

the processor 380 is configured to obtain benchmark duration for interface switching;

the input apparatus 330 is configured to trigger, according to an input of a user, the processor 380 to perform interface switching;

the processor 380 is further configured to determine, after the interface switching, switching duration of the interface switching; and the processor 380 is further configured to stop, according to a preset process priority, a process having a lower priority, if the switching duration is longer than the benchmark duration, and a difference between the switching duration and the benchmark duration is greater than a preset threshold. The memory 320 included in the device may be used to store the preset threshold.

Optionally, the processor 380 is configured to:

detect at least one time of interface switching that is within preset duration after startup;

detect switching duration of the at least one time of interface switching; and calculate an average value of the switching duration of the at least one time of interface switching, and use the average value as the benchmark duration for interface switching.

Optionally, the interface switching includes interface switching of a first switching type, and the processor 380 is configured to:

detect, during the preset duration from interface switching of the first switching type performed for the first time after startup, at least one time of interface switching of the first switching type; and detect switching duration of the at least one time of interface switching; and the processor 380 is configured to:

calculate an average value of the switching duration of the at least one time of interface switching of the first switching type within the preset duration, and use the average value as benchmark duration for interface switching of the first switching type.

Optionally, the processor 380 is configured to:

obtain benchmark duration for interface switching of at least one switching type.

The processor 380 is configured to:

determine first benchmark duration corresponding to the interface switching of the at least one switching type; and stop, according to a preset process priority preset in the memory, a process having a lower priority, if the switching duration is longer than the first benchmark duration, and a difference between the switching duration and the first benchmark duration is greater than a preset threshold stored in the memory.

Optionally, the processor 380 is configured to:

detect first interface switching during a preset period, and determine switching duration of the first interface switching; or after interface switching of a preset switching type, determine switching duration of the interface switching.

Optionally, the input apparatus 330 is configured to receive a process stopping input; and the processor 380 is configured to:

obtain switching duration of last interface switching prior to the stopping input; and the processor 380 is configured to:

if the switching duration of the last interface switching prior to the stopping input is longer than the benchmark duration, and a difference between the switching duration of the last interface switching prior to the stopping input and the benchmark duration is less than the preset threshold stored in the memory, reduce the preset threshold according to the switching duration and the benchmark duration.

In this embodiment of the present invention, benchmark duration for interface switching is obtained; after interface switching processing, switching duration of the interface switching processing is determined; and if the switching duration is longer than the benchmark duration, and a difference between the switching duration and the benchmark duration is greater than a preset threshold, a process having a lower priority is stopped according to a preset process priority. In this manner, when switching duration is longer than benchmark duration, and a difference between the switching duration and the benchmark duration is greater than a preset threshold, a terminal can automatically perform process stopping processing, without the need of manually selecting, by a user, a process that needs to be stopped. Therefore, process management efficiency can be improved.

Embodiment 4

Figure 4:
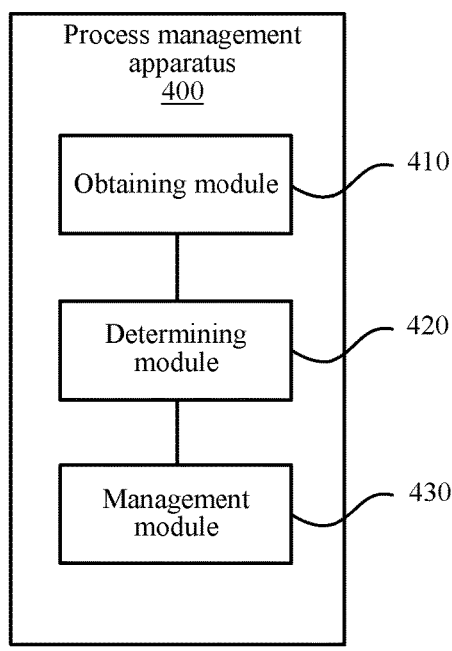
FIG. 4 is a schematic structural diagram of a process management apparatus 400 according to an embodiment of the present invention.

Based on a same technical contemplation, an embodiment of the present invention further provides a process management apparatus 400. As shown in FIG. 4, the apparatus 400 includes:

an obtaining module 410, configured to obtain benchmark duration for interface switching;

a determining module 420, configured to determine, after interface switching, switching duration of the interface switching; and a management module 430, configured to stop, according to a preset process priority, a process having a lower priority if the switching duration is longer than the benchmark duration, and a difference between the switching duration and the benchmark duration is greater than a preset threshold.

Optionally, the obtaining module 410 is configured to:

detect at least one time of interface switching that is within preset duration after startup;

detect switching duration of the at least one time of interface switching; and calculate an average value of the switching duration of the at least one time of interface switching, and use the average value as the benchmark duration for interface switching.

Optionally, the interface switching includes interface switching of a first switching type, and the obtaining module 410 is configured to:

detect, during the preset duration from interface switching of the first switching type performed for the first time after startup, at least one time of interface switching of the first switching type; and detect switching duration of the at least one time of interface switching; and the obtaining module 410 is configured to:

calculate an average value of the switching duration of the at least one time of interface switching of the first switching type within the preset duration, and use the average value as benchmark duration for interface switching of the first switching type.

Optionally, the obtaining module 410 is configured to:

obtain benchmark duration for interface switching of at least one switching type; and the management module 430 is configured to:

determine first benchmark duration corresponding to the interface switching of the at least one switching type; and stop, according to a preset process priority, a process having a lower priority if the switching duration is longer than the first benchmark duration, and a difference between the switching duration and the first benchmark duration is greater than a preset threshold.

Optionally, the determining module 420 is configured to:

detect first interface switching during a preset period, and determine switching duration of the first interface switching; or after interface switching of a preset switching type, determine switching duration of the interface switching.

Optionally, the apparatus further includes an adjustment module, configured to:

receive a process stopping input, and obtain switching duration of last interface switching prior to the stopping input; and if the switching duration of the last interface switching prior to the stopping input is longer than the benchmark duration, and a difference between the switching duration of the last interface switching prior to the stopping input and the benchmark duration is less than the preset threshold, reduce the preset threshold according to the switching duration and the benchmark duration.

In this embodiment of the present invention, benchmark duration for interface switching is obtained; after interface switching, switching duration of the interface switching is determined; and if the switching duration is longer than the benchmark duration, and a difference between the switching duration and the benchmark duration is greater than a preset threshold, a process having a lower priority is stopped according to a preset process priority. In this manner, when switching duration is longer than benchmark duration, and a difference between the switching duration and the benchmark duration is greater than a preset threshold, a terminal can automatically perform process stopping processing, without the need of manually selecting, by a user, a process that needs to be stopped. Therefore, process management efficiency can be improved.

It should be noted that, when the process management apparatus provided in the foregoing embodiment manages a process, division of the foregoing functional modules is merely used as an example for description. In an actual application, the foregoing functions can be allocated to and completed by different modules according to a requirement, that is, an inner structure of a device is divided into different function modules to implement all or some of the functions described above. In addition, the process management apparatus provided in the foregoing embodiment and the process management method embodiment share a same conception, and for a specific implementation process thereof, refer to the method embodiment, and details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method, comprising:
    obtaining a benchmark duration for interface switching, wherein the interface switching includes switching a first interface displayed on a terminal with a different interface to be displayed on the terminal;
    determining, after the interface switching, a first switching duration of the interface switching;
    automatically stopping, according to a preset process priority and without user intervention, a process associated with the first interface having a priority lower than the preset process priority, when the first switching duration is longer than the benchmark duration and a difference between the first switching duration and the benchmark duration is greater than a preset threshold;
    adjusting the preset threshold;
    receiving a process stopping input;
    obtaining a second switching duration of a last interface switching prior to receiving the process stopping input; and
    if the second switching duration is longer than the benchmark duration, and a difference between the second switching duration and the benchmark duration is less than the adjusted preset threshold, reducing the adjusted preset threshold according to the second switching duration and the benchmark duration.

2. The method according to claim 1, wherein obtaining the benchmark duration for interface switching comprises:
    detecting at least one time of interface switching that is within a preset duration after startup of the terminal;
    detecting a switching duration of the at least one time of interface switching; and
    calculating an average value of the switching duration of the at least one time of interface switching, and using the average value as the benchmark duration for interface switching.

3. The method according to claim 2, wherein:
    the interface switching comprises interface switching of a first switching type; and, wherein
    detecting the at least one time of interface switching that is within the preset duration after the startup, and detecting the switching duration of the at least one time of interface switching comprises:
        detecting, during the preset duration from interface switching of the first switching type performed for the first time after startup, at least one time of interface switching of the first switching type; and
        detecting a switching duration of the at least one time of interface switching; and, wherein
    calculating the average value of the switching duration of the at least one time of interface switching, and using the average value as the benchmark duration for interface switching comprises:
        calculating an average value of the switching duration of the at least one time of interface switching of the first switching type within the preset duration, and using the average value as benchmark duration for interface switching of the first switching type.

4. The method according to claim 1, wherein:
    obtaining the benchmark duration for interface switching comprises:
        obtaining the benchmark duration for interface switching of at least one switching type; and, wherein
    automatically stopping, according to a preset process priority and without user intervention, a process associated with the first interface having a lower priority than the preset process priority, when if the first switching duration is longer than the benchmark duration and a difference between the first switching duration and the benchmark duration is greater than a preset threshold further comprises:
        determining a first benchmark duration corresponding to the interface switching of the at least one switching type.

5. The method according to claim 1, wherein determining, after the interface switching, a first switching duration of the interface switching comprises:
    detecting a first interface switching during a preset period and determining the first switching duration of the first interface switching; or
    after the first interface switching of a preset switching type, determining the first switching duration of the first interface switching.

6. A device, comprising:
    an input apparatus configured to:
        trigger, according to an input of a user, interface switching, and
        receive a process stopping input; and
    a processor configured to:
        obtain a benchmark duration for the interface switching, wherein the interface switching includes switching a first interface displayed on a terminal of the device with a different interface to be displayed on the terminal,
        determine, after the interface switching, a first switching duration of the interface switching,
        automatically stop, according to a preset process priority and without user intervention, a process associated with the first interface having a priority lower than the preset process priority, when the first switching duration is longer than the benchmark duration, and a difference between the first switching duration and the benchmark duration is greater than a preset threshold,
        adjust the preset threshold,
        obtain a second switching duration of a last interface switching prior to receiving the process stopping input, and
        if the second switching duration is longer than the benchmark duration, and a difference between the second switching duration and the benchmark duration is less than the adjusted preset threshold, reduce the adjusted preset threshold according to the second switching duration and the benchmark duration.

7. The device according to claim 6, wherein the processor is further configured to:
    detect at least one time of interface switching that is within a preset duration after startup of the terminal,
    detect a switching duration of the at least one time of interface switching, and
    calculate an average value of the switching duration of the at least one time of interface switching, and use the average value as the benchmark duration for interface switching.

8. The device according to claim 7, wherein:
    the interface switching comprises interface switching of a first switching type, and the processor is further configured to:
    detect, during the preset duration from interface switching of the first switching type performed for the first time after startup, at least one time of interface switching of the first switching type,
    detect a switching duration of the at least one time of interface switching, and
    calculate an average value of the switching duration of the at least one time of interface switching of the first switching type within the preset duration, and use the average value as benchmark duration for interface switching of the first switching type.

9. The device according to claim 6, wherein the processor is further configured to:
    obtain the benchmark duration for interface switching of at least one switching type, and
    determine a first benchmark duration corresponding to the interface switching of the at least one switching type.

10. The device according to claim 6, wherein the processor is further configured to:
    detect a first interface switching during a preset period and determine the first switching duration of the first interface switching, or
    after the first interface switching of a preset switching type, determine the first switching duration of the first interface switching.

11. A non-transitory computer readable medium storing instructions to cause user equipment to perform operations comprising:
    obtaining a benchmark duration for interface switching, wherein the interface switching includes switching a first interface displayed on a terminal of the user equipment with a different interface to be displayed on the terminal;
    determining, after the interface switching, a first switching duration of the interface switching;
    automatically stopping, according to a preset process priority and without user intervention, a process associated with the first interface having a priority lower than the preset process priority, when the first switching duration is longer than the benchmark duration and a difference between the first switching duration and the benchmark duration is greater than a preset thresholds;
    adjusting the preset threshold;
    receiving a process stopping input;
    obtaining a second switching duration of a last interface switching prior to receiving the process stopping input; and
    if the second switching duration is longer than the benchmark duration, and a difference between the second switching duration and the benchmark duration is less than the adjusted preset threshold, reducing the adjusted preset threshold according to the second switching duration and the benchmark duration.

12. The non-transitory computer readable medium according to claim 11, wherein obtaining the benchmark duration for interface switching comprises:
    detecting at least one time of interface switching that is within a preset duration after startup of the terminal;
    detecting a switching duration of the at least one time of interface switching; and
    calculating an average value of the switching duration of the at least one time of interface switching, and using the average value as the benchmark duration for interface switching.

13. The non-transitory computer readable medium according to claim 12, wherein:
    the interface switching comprises interface switching of a first switching type; and, wherein
    detecting the at least one time of interface switching that is within the preset duration after startup, and detecting the switching duration of the at least one time of interface switching comprises:
        detecting, during the preset duration from interface switching of the first switching type performed for the first time after startup, at least one time of interface switching of the first switching type; and
        detecting a switching duration of the at least one time of interface switching; and, wherein
    calculating an average value of the switching duration of the at least one time of interface switching, and using the average value as the benchmark duration for interface switching comprises:
        calculating an average value of the switching duration of the at least one time of interface switching of the first switching type within the preset duration, and using the average value as benchmark duration for interface switching of the first switching type.

14. The non-transitory computer readable medium according to claim 11, wherein obtaining the benchmark duration for interface switching comprises:
    obtaining the benchmark duration for interface switching of at least one switching type; and, wherein
    automatically stopping, according to a preset process priority and without user intervention, a process associated with the first interface having a lower priority than the preset process priority, when the first switching duration is longer than the benchmark duration and a difference between the first switching duration and the benchmark duration is greater than a preset threshold further comprises:
        determining a first benchmark duration corresponding to the interface switching of the at least one switching type.

15. The non-transitory computer readable medium according to claim 11, wherein determining, after the interface switching, a first switching duration of the interface switching comprises:
    detecting a first interface switching during a preset period and determining the first switching duration of the first interface switching; or
    after the first interface switching of a preset switching type, determining the first switching duration of the first interface switching.

* * * * *